United States Patent [19]

Lennox et al.

[11] Patent Number: 5,773,122
[45] Date of Patent: Jun. 30, 1998

[54] REINFORCED CARBON COMPOSITES

[75] Inventors: James R. Lennox, Saco; Daniel C. Nelson, Old Orchard Beach; Roger T. Pepper, Saco, all of Me.

[73] Assignee: Fiber Materials, Inc., Biddeford, Me.

[21] Appl. No.: 744,361

[22] Filed: Nov. 7, 1996

Related U.S. Application Data

[62] Division of Ser. No. 591,147, Oct. 1, 1990, Pat. No. 5,597,611.

[51] Int. Cl.$^6$ .............................. B32B 5/02; B32B 5/08; B32B 7/04
[52] U.S. Cl. ..................... 428/119; 428/408; 428/113; 428/119; 442/243; 442/269; 442/381
[58] Field of Search .................................. 428/114, 408, 428/113, 119; 442/243, 269, 381

[56] References Cited

U.S. PATENT DOCUMENTS

| | | | |
|---|---|---|---|
| 3,808,087 | 4/1974 | Milewski et al. | 161/72 |
| 4,014,980 | 3/1977 | Fujimaki et al. | 423/448 |
| 4,328,272 | 5/1982 | Maistre . | |
| 5,637,375 | 6/1997 | Hohman | 428/113 |

FOREIGN PATENT DOCUMENTS

| | | |
|---|---|---|
| 0150566 | 8/0000 | European Pat. Off. . |
| 1423240 | 2/0000 | United Kingdom . |
| 2002685 | 2/0000 | United Kingdom . |
| 2027418 | 2/0000 | United Kingdom . |
| 2199856 | 7/0000 | United Kingdom . |
| 1549687 | 8/0000 | United Kingdom . |
| 1254732 | 11/0000 | United Kingdom . |
| 1215589 | 12/0000 | United Kingdom . |

*Primary Examiner*—Kathleen Choi
*Attorney, Agent, or Firm*—Lappin & Kusmer LLP

[57] ABSTRACT

Layered carbon-carbon composites having improved interlaminar tensile strength are disclosed together with a process for making such composites. A metal catalyst is first deposited on a panel comprising a plurality of layers of carbon fiber cloth. The panel is then exposed to a gaseous hydrocarbon in an inert atmosphere at elevated temperature in order to promote the growth of graphite whiskers between the carbon cloth layers.

6 Claims, 1 Drawing Sheet

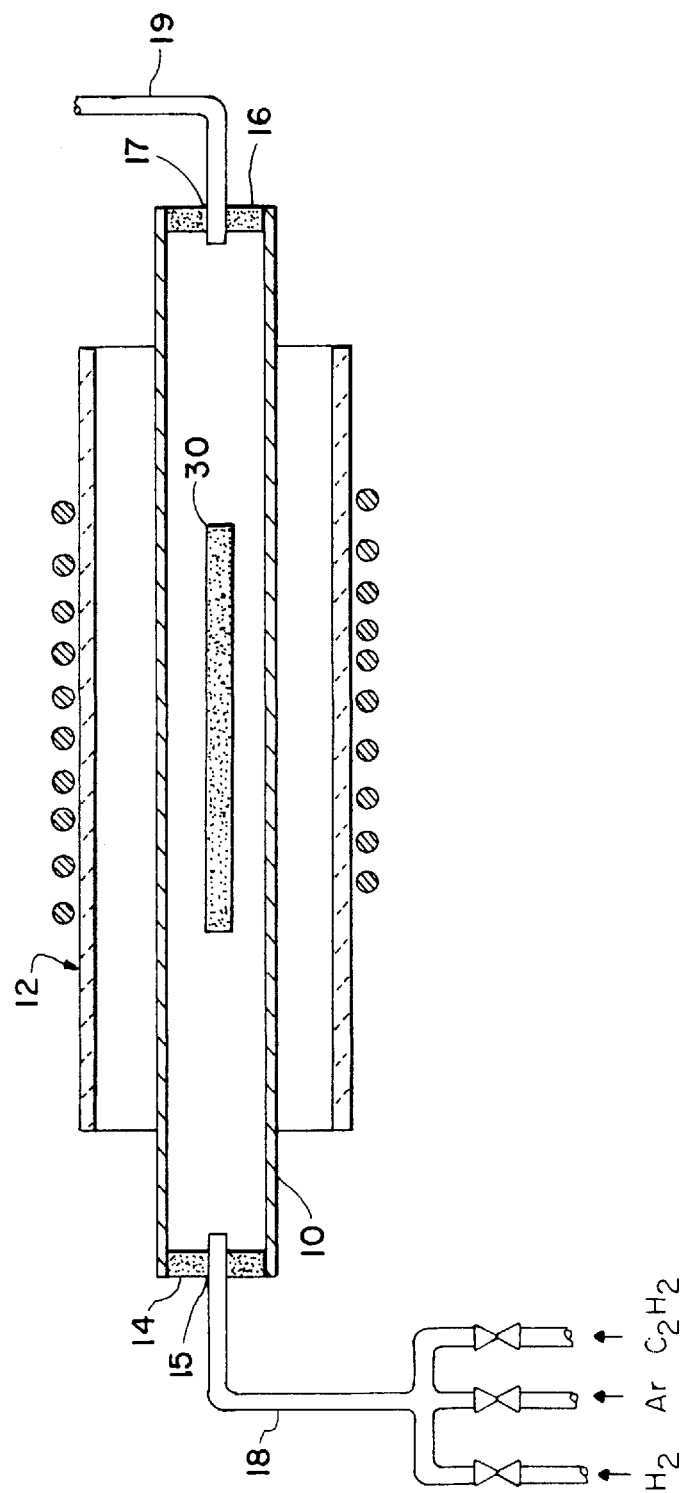

REINFORCED CARBON COMPOSITES

This application is a division of U.S. Application Ser. No. 07/591,147 filed Oct. 1, 1990, now U.S. Pat. No. 5,597,611.

The present invention relates to carbon materials and more particularly to layered carbon-carbon composites having improved interlaminar tensile strength. Such materials are useful in a wide range of high-temperature, high-performance applications such as in air and space craft, and the like.

Carbon-carbon composites, well-known in the art, generally are carbon matrices reinforced with carbon fibers aligned or distributed therein. Such composites have been formed by a variety of methods, usually involving the impregnation of a porous carbon fiber structure with a resin or other pyrolytic carbon precursor. For example, a plurality of sheets such as mats, felts, knitted, braided or woven cloth and the like, formed of carbon fibers, can be stacked to form a multilayered body which is then impregnated by a pressure or evacuation technique with a binder of pitch or a synthetic carbon-yielding resin that is subsequently polymerized. The impregnated body is thereafter pyrolyzed by heating to temperatures sufficiently high to convert the impregnant binder to a carbon matrix, the fibers of the sheet thus providing desired reinforcement.

One of the major infirmities of multilayered carbon fiber composites is the relatively low strength of the bonds between the layers, conferring substantial anisotropy of the composite. The interlaminar tensile strength of these composites typically relies solely on the inherently brittle carbon matrix material and, therefore, is typically an order of magnitude less than the in-plane tensile strength.

Interlaminar tensile strength of carbon composites can be improved by weaving, knitting or braiding carbon fiber into three-dimensional configurations or more complex multidirectional composites. Such processes, however, are very labor intensive and thus very expensive compared, for example, with weaving two-dimensional cloth and then layering the cloth into composites.

Accordingly, a principal object of this invention is the provision of a method of improving the interlaminar tensile strength of multilayered carbon composites. Another object of this invention is to provide a relatively inexpensive process for preparing such improved interlaminar-reinforced carbon composites. A further object of this invention is to provide a novel carbon composite containing interlaminar graphite whiskers for reinforcement. Still a further object of this invention is to provide a process for growing interlaminar graphite whiskers in situ in multilayered carbon composites.

Yet other objects of the present invention will in part be obvious and will in part appear hereinafter. The invention accordingly comprises the processes comprising the several steps and relation of one or more of such steps with respect to the others, and the products and compositions possessing the features, properties and relation of elements, all of which are exemplified in the following detailed disclosure and the scope of the application of which will be indicated in the claims.

For a fuller understanding of the nature and objects of the present invention, reference should be had to the following detailed description taken in connection with the accompanying drawing wherein there is shown a schematic elevational diagram of apparatus for effecting the principal process steps in one specific embodiment of the present invention.

Briefly, the present invention is embodied in a process for preparing carbon composites by depositing a metal catalyst within a stack of carbon fiber sheets, and growing carbon whiskers extending substantially transversely between the sheets, the growth being promoted by the catalyst. The resulting stack can be impregnated with a carbonizable precursor material which is then pyrolyzed.

It is well-known that graphite whiskers can be prepared by decomposing hydrocarbons in an inert atmosphere using metal catalyst particles to initiate the reaction. Representative examples of literature describing such processes include P. A. Tesner, E. Y. Robinovich, I. S. Rafalkes, and E. F. Arefieva, "Formation of Carbon Fibers from Acetylene", Carbon, Vol. 8 (1970) pp. 435–442; R. T. K. Baker, J. J. Chludzinski, Jr., C. R. F. Lund, "Further Studies of the Formation of Filmentous Carbon from the Interaction of Supported Iron Particles with Acetylene", Carbon, Vol. 25 (1987) pp. 295–303; G. G. Tibbetts, M. Endo, C. P. Beetz, Jr., "Carbon Fibers Grown from the Vapor Phase: A Novel Material", SAMPE Journal, September/October 1986, pp. 30–35; E. L. Evans, J. M. Thomas, P. A. Thrower, P. L. Walker, "Growth of Filamentary Carbon on Metallic Surfaces During the Pyrolysis of Methane and Acetone", Carbon, Vol. 11 (1973), pp. 441–445; and, J. L. Bradley, G. G. Tibbetts, "Improved Yield of Carbon Fibers by Pyrolysis of Natural Gas in Stainless Steel Tubes", Carbon, Vol. 23 (1985) pp. 423–430. There appears, however, to be no teaching or suggestion in the literature that multilayered carbon composite materials can be improved by providing carbon whiskers intertwined between the layers; the literature neither teaches nor suggests using any process to grow graphite whiskers in situ as a method of reinforcing carbon composites, specifically improving the interlaminar tensile strength of multilayered carbon cloth composites.

In a preferred embodiment, a multilayered carbon fiber composite for use in this invention is prepared by first impregnating a two-dimensional carbon fiber sheet or panel such as cloth with a phenolic resin, the impregnated cloth being cut to the desired dimensions for the final composite. A plurality of the dimensioned pieces of impregnated cloth are next stacked in a hot press in which, typically, approximately 100 psi of pressure is applied while simultaneously heating the stack to about 175° C. in order to cure the resin. The cured panel is then heated sufficiently in an inert atmosphere to carbonize the resin and form a porous body. It is understood, however, that the particular process employed in the preparation of the multilayered carbon composite precursor is not critical to carrying out this invention. Porous carbon cloth composites prepared in other conventional ways, for example using a binder of pitch or a synthetic carbon-yielding resin in place of the phenolic resin or varying the process conditions, would generally also be suitable starting materials. It has been found, however, that it is important to at least partially impregnate the stack of layers so that they can be pyrolyzed into a relatively rigid body prior to growth of the interlaminar whiskers, thereby preventing the whisker growth from forcing the layers apart.

In order to prepare the porous carbon body for further treatment, a suitable metal catalyst must be deposited throughout the body, the catalyst being selected as one which will catalyze the growth of carbon whiskers from a vapor phase. The more thoroughly the metal catalyst can be distributed throughout the matrix of the carbon composite, the more effective the process of this invention will be at improving the interlaminar tensile strength of the end product. A variety of conventional deposition techniques, such as chemical vapor deposition, can be used for distributing the metal catalyst through the porous carbon body after it is formed, although it is understood that the catalyst can be distributed onto or through the individual sheets prior to stacking or assembly.

A preferred technique for depositing the metal catalyst within the carbon body comprises applying a solution of a compound of the desired metal to the porous body followed by reduction of the compound to the metal. The compound should be selected so that it is readily decomposable by heat to the catalytic metal. The solution may be applied to the body by soaking the panel in an appropriate bath, or by spraying or painting the body with the solution. For best performance, the body should imbibe the solution for a time sufficient to insure that the solution has thoroughly permeated the interstitial structure of the carbon body. Upon removal from the bath, the panel can be dried, for example in an oven at about 100° C. for about one hour, to remove excess solvent and fix crystals of the metal compound throughout the porous matrix of the carbon composite.

Reduction of the metal compound can then be effected by heating the carbon panel in an inert atmosphere to a temperature above the decomposition temperature of the metal compound for a period of time sufficient to decompose substantially all of the metal compound. Gaseous decomposition products will disperse leaving particles of the metal catalyst distributed throughout the matrix of the carbon composite.

In the next step of the preferred process, the carbon body, with metal catalyst distributed throughout, is exposed to a gaseous hydrocarbon at elevated temperature. The metal catalyst is selected as one that will initiate the conversion of the gaseous hydrocarbon to transverse graphite whiskers which extend between and reinforce the layers of the carbon composite, thereby improving the interlaminar tensile strength of the latter. The resulting product is a novel carbon composite comprising layers of carbon fiber sheets intertwined with graphite whiskers.

Various combinations of metal catalyst and hydrocarbon suitable for this invention include: the metals iron, nickel, cobalt, chrome, and combinations thereof; and the hydrocarbons benzene, methane, acetylene, and combinations thereof. These listings are intended to be representative only and do not exclude other metal catalysts or hydrocarbons that would function in a substantially identical manner. Selection of a metal catalyst-hydrocarbon combination for use in this invention will also be based on cost and availability considerations. Further, it should be noted that the catalyst type and particle size have a direct influence on graphite whisker diameter and yield.

The temperature at which the metal catalyst promotes the conversion of hydrocarbon to graphite whiskers is typically in the range of about 600°–800° C. The optimum conversion temperature will vary, however, depending on the specific metal-hydrocarbon combination being used. The length of time the carbon panel must be exposed to the hydrocarbon at elevated temperature in order to catalyze substantial growth of interlaminar graphite whiskers may vary from a few minutes to several hours or longer depending on the structure of the carbon composite, the catalyst-hydrocarbon combination, and other variables. Selection of these several process variables is a matter of routine experimentation.

In order to improve interlaminate bonding still further, one may cycle the metal catalyst deposition step and/or the graphite whisker growth step two or more times. In repeating the deposition and whisker growth steps, one may also use different metal catalyst-hydrocarbon combinations than were used in earlier treatment steps.

To further improve the properties of the carbon composite, the graphite whisker growth process can be followed by a densification process using a phenolic resin, pitch, CVD, or any other natural or synthetic precursor material that can be converted to carbon by pyrolysis. This densification step may be repeated several times to add carbon matrix material to the composite and increase its density.

A preferred apparatus for carrying out the metal catalyst reduction and graphite whisker growth steps is shown in the drawing wherein a quartz-lined stainless steel reaction tube 10 of suitable dimensions to accommodate the carbon composite body 30, is at least partly housed in an induction heated tube furnace 12. Tube furnace 12 may include optional conventional control and temperature measurement apparatus (not shown) such as a rheostat and optical pyrometer. The ends of reaction tube 10 are sealed with graphite end caps 14 and 16 having respective apertures 15 and 17 to accommodate respectively inlet tube 18 and outlet (vent) tube 19.

For a better understanding of the present invention, the following examples are presented. These examples are intended only as representative embodiments of this invention (or, in the case of Example 1, of the prior art) and should in no way be construed as limiting the field or scope of this invention.

EXAMPLE 1

To produce a representative control sample of a layered carbon composite without the reinforcing graphite whiskers of the present invention for comparison against samples produced in accordance with this invention, six layers of carbon fiber cloth cross-woven from carbon yarns (6000 filament tow commercially available from BASF, New Jersey, as Celion 6K) were laminated into a two-dimensional carbon-carbon composite and the resulting body was densified by impregnation with phenolic resin and pyrolyzation, as described above, for four cycles.

EXAMPLE 2

A laminate of six layers of the same cloth was prepared as described in Example 1. The treatment thereof in accordance with the present invention will be described hereinafter in connection with the apparatus shown in the drawing. Thus, following initial densification, the laminate was formed into body 30 by treatment by immersion in a 2% nickel nitrate aqueous bath under vacuum for about one hour to displace most of the air in the interstices of the porous carbon body with nickel nitrate solution. Body 30 was then removed from the solution and dried at 100° C. After being immersed in nickel nitrate solution and dried, carbon body 30 was loaded into reaction tube 10 which was then placed inside furnace 12. End caps 14 and 16 were emplaced, and inlet and outlet tubes 18 and 19 were installed in apertures 15 and 17 respectively. The system was purged with argon gas fed through tube 18 to displace any air and the tube furnace was heated to 600° C., to decompose the nickel nitrate, dispersed throughout carbon body 30, to nickel particles. The gaseous decomposition products from the nickel nitrate reduction were flushed from the system in the argon stream through vent tube 19.

The argon flow was turned off and, in lieu thereof, a mixture of acetylene and hydrogen gas (e.g., 1% $C_2H_2$ in $H_2$) was introduced to the system through tube 18. During this step, the furnace temperature was maintained at between 600° and 800° C. for a period of six hours to promote the growth of interlaminar graphite whiskers by nickel-catalyzed decomposition of the acetylene. At the conclusion of the selected reaction period, the hydrogen and acetylene flows were turned off, the flow of argon was resumed, and furnace 12 and reaction tube 10 were allowed to cool. This whisker growth process was repeated for five cycles, being carried out each time at 600° C. for six hours.

To further improve the properties of the carbon composite, the graphite whisker growth process was followed by a final densification stage in which the panel was impregnated with phenolic resin under vacuum, and then heated to 175° C., to cure the resin. The impregnated panel was carbonized by heating to 800° C. in an inert atmosphere. This densification step was repeated four times to add carbon matrix material to the composite and increase its density.

EXAMPLE 3

This carbon body was prepared and processed in the same manner as that of Example 2 except that a 10% nickel nitrate bath was used, the whisker growth process was repeated for eight cycles, and the final densification step was carried out each time at 800° C. for two hours. Also, the first carbonization cycle was combined with the whisker growth cycle for a more efficient operation.

EXAMPLE 4

This carbon body was prepared and processed in the same manner as the body of Example 3 except the it was subjected to six densification cycles instead of four.

EXAMPLE 5

This body was prepared and processed in the same manner as that of Example 3 except that the carbon yarns used to weave the cloth were 3000 filament tow commercially available from Fiber Materials, Inc. of Maine as Apollo 55 3K carbon fibers.

EXAMPLES 6 AND 7

These bodies were prepared and processed in the same manner as the panel of Example 5 except the densification steps were carried out using CVD instead of phenolic resin.

The carbon bodies prepared according to the seven examples described above were then tested for density and average interlaminar tensile strength according to standard testing procedures using an Instron Universal Testing machine in which the faces of a pair of opposed, aligned pistons were respectively glued with an epoxy adhesive to opposite surfaces of a disc of the composite under test, and then the pistons were pulled apart under a tensile gradient until the laminate sheared. The results of these tests are summarized in Table 1 below:

TABLE 1

| EX-AMPLE | CLOTH TYPE | WHIS-KERIZ-ING TEM-PERA-TURE | DENSI-FICA-TION METHOD | DENSITY (g/cc) | AVERAGE INTER-LAMINAR TENSILE STRENGTH |
|---|---|---|---|---|---|
| 1 | CELION 6K | BASE-LINE | PHENOLIC (4 CYCLES) | 1.05 | 32.0 PSI |
| 2 | CELION 6K | 600° C. | PHENOLIC (4 CYCLES) | 1.08 | 61.3 PSI |
| 3 | CELION 6K | 800° C. | PHENOLIC (4 CYCLES) | — | 130.0 PSI |
| 4 | CELION 6K | 800° C. | PHENOLIC (6 CYCLES) | 1.47 | 198.0 PSI |
| 5 | APOLLO ™ 55 3K | 800° C. | PHENOLIC (4 CYCLES) | — | 84.5 PSI |
| 6 | APOLLO ™ 55 3K | 800° C. | CVD | 1.29 | 110.4 PSI |
| 7 | APOLLO ™ 55 3K | 800° C. | CVD | 1.09 | 212.3 PSI |

In general, it is seen that carbon composite panels prepared in accordance with this invention showed average interlaminar tensile strengths from 1.9 to 6.6 times that of the reference panel (Example 1). Using the graphite whisker growth process of this invention at 600° C. nearly doubled the interlaminar tensile strength from 32.0 psi to 61.3 psi. Carrying out the graphite whisker growth process at 800° C. with a higher nickel nitrate concentration and processing the parts through more cycles, doubled the tensile strength again to 130 psi. Additional interlaminar tensile strength improvement was obtained by increasing the number of phenolic densification cycles and by using CVD densification. The results show a significant improvement in through-the-thickness tensile strength of laminated carbon cloth composites treated in accordance with this invention as compared with the reference panel of Example 1.

However, it should be noted that the absolute strength values found in the testing of the laminates relative to the state-of-the-art in 2D carbon-carbon are low. Six hundred psi through-the-thickness tensile strength is typical of optimized 2D carbon-carbon such as NASA's ACC-4. The reason for the disparity between the present results and the test values typical of ACC-4 are twofold. First, the satin-weave carbon fiber cloth is used with ACC-4 as opposed to the cross-weave cloth used in the present Examples. Satin-weave cloth has less in-plane fiber disorientation and makes 2D composites with less intercloth layer void space than cross-weave cloth. Secondly, higher densities are achieved with the ACC-4 composite material as compared to the composites of the present work. It is well known that through-the-thickness tensile values of 2D carbon-carbon drop off rapidly at densities below 1.6 g/cc.

Since certain changes may be made in the above-described processes and products without departing from the scope of the invention herein involved, it is intended that all matter contained in the above description shall be interpreted in an illustrative and not in a limiting sense.

What is claimed is:

1. A carbon composite comprising a plurality of carbon layers reinforced with carbon fibers and interlinking graphite whiskers between said layers.

2. A carbon composite as set forth in claim 1 wherein said whiskers extend substantially transversely between said layers.

3. A carbon composite as set forth in claim 1 having an average interlaminar tensile strength at least 1.9 times greater than the average interlaminar tensile strength of a composite of like composition that does not contain said graphite whiskers.

4. A carbon composite as set forth in claim 1 wherein said composite is initially formed as a relatively rigid porous carbon body having distributed in the pores of said body a metal catalyst capable of initiating the deposition of carbon whiskers from a carbon-containing vapor, and having been at least partially impregnated with a subsequently densified and pyrolyzed carbonaceous material.

5. A carbon composite as set forth in claim 4 wherein said whiskers are provided by growth thereof from a carbon-containing vapor.

6. A carbon as set forth in claim 5 wherein said layers are prebonded together to prevent said growth of said whiskers from forcing said the layers apart.

* * * * *